C. D. MAHONY.
VEHICLE WHEEL.
APPLICATION FILED JULY 14, 1914.
1,282,256.
Patented Oct. 22, 1918.
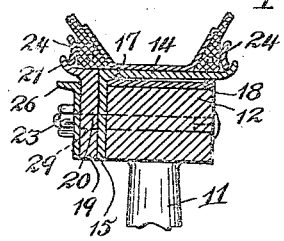
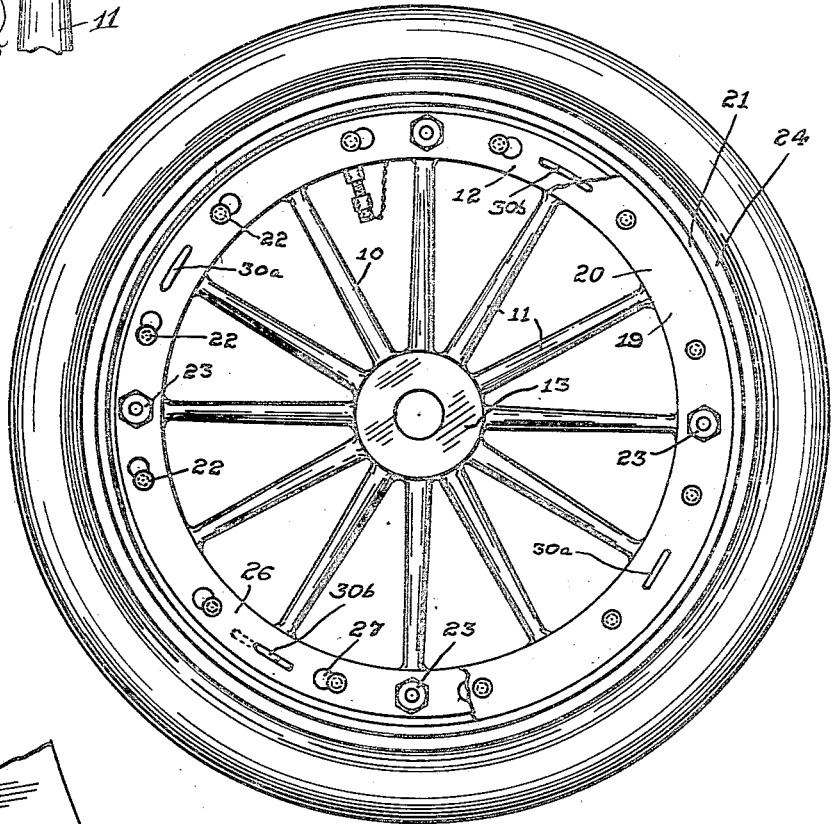
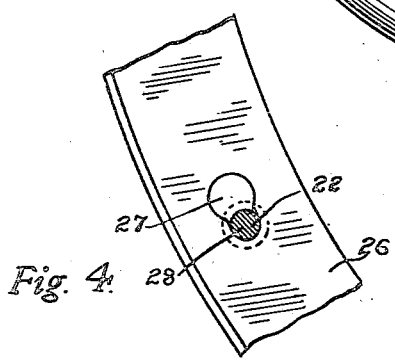
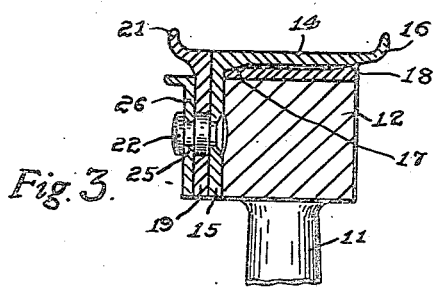
Witnesses
C. W. Fidler
W. J. Day
Inventor.
Charles Daniel Mahony.
by his attorneys
Fetherstonhaugh & Co.

UNITED STATES PATENT OFFICE.

CHARLES DANIEL MAHONY, OF ST. JOHN, NEW BRUNSWICK, CANADA.

VEHICLE-WHEEL.

1,282,256.   Specification of Letters Patent.   Patented Oct. 22, 1918.

Application filed July 14, 1914.   Serial No. 850,916.

*To all whom it may concern:*

Be it known that I, CHARLES DANIEL MAHONY, a resident of No. 110 Princess street, in the city of St. John, in the city and county of St. John, Province of New Brunswick, Dominion of Canada, gentleman, and a subject of the King of Great Britain, have invented certain new and useful Improvements in Vehicle-Wheels, of which the following is the specification.

This invention relates to vehicle wheels, and more especially to the rim construction thereof. The objects of the invention are to devise a wheel having a demountable part that shall be inexpensive in prime cost, be expedient of manufacture and shall not only facilitate the removal of tires and the subsequent renewal, but shall also safeguard the tires and air-tubes during such processes. Further objects of the invention are to provide a device having a minimum number of moving parts and also a positive locking apparatus, and these of simple and substantial form.

The invention consists essentially in the novel construction and arrangement of parts hereinafter described, and illustrated in the drawings which form part of this specification.

In the drawings:—

Figure 1 is an elevation of a vehicle wheel constructed according to my invention.

Fig. 2 is a sectional elevation taken on the line "A—B" in Fig. 1.

Fig. 3 is a sectional elevation taken on the line "C—D" in Fig. 1.

Fig. 4 is an elevation of part of the locking ring, showing the locking stud with the head cut off.

In the drawing, like numerals of reference indicate corresponding parts in each of the figures.

The wheel 10, having if desired, the spokes 11 and the "felly" 12, also the hub 13, may be of any ordinary or convenient form, and do not form part of my invention which is confined to the rim.

On the "felly" 12, is mounted an annular rim part 14, having a flange 15 offset inwardly at one edge, and another smaller flange 16 offset outwardly on the other edge. This rim part is preferably made with tapered parts 17 and 18 on the inner periphery, adapted to engage correspondingly tapered parts on the exterior of the fixed rim or felly band.

Another annular rim part 19, also having an inwardly offset flange 20, and an outwardly offset flange 21, is secured to the rim part 14, by studs 22, and also by the bolts 23 which pass through both rim parts, and through the felly band also, securing the demountable rim as a whole, to the wheel.

I prefer to use separate tire-clamping rings 24 loosely mounted on the rim parts 14 and 19, but do not wish to confine myself to this construction, as the flanges 16 and 21 may be so shaped as to take the place of any suitable form of clamp-ring for the tires.

The means of locking the parts of the demountable rim together, is by the studs 22 which are secured to the flange 15, and pass through the open orifices provided for them, in the flange 20. The studs are provided with an annular groove 25 at that part which projects through the flange 20, and this groove is used in combination with the locking-ring 26, which has key-hole slots 27 adapted to engage in these grooves at the narrow end of the slot 28.

A feature of importance in the construction, is to make the locking-ring 26, also the grooves 25, of less width than the flange 20. This prevents the flanges of the rim catching in the stud grooves, when the parts are being fitted together.

The holes 29 for the bolts 23, are so arranged that they are not in line for putting the bolts in, until the ring 26 is in its locked position.

In the operation of the device, to remove a tire, the bolts 23 are first removed. Should it be considered desirable then, the complete rim, with the tire on it, may be removed from the vehicle, as for instance to a place out of the rain, or to a place in the shade where it was more convenient to work; otherwise the rim may left *in situ.*

A lever is used to partially rotate the locking ring 26, so that the larger ends of the key-hole slots come opposite the studs 22. This lever is inserted in the slot 30, which is formed in not only the locking ring 26 but also the flanges 15 and 19; and if desired may extend farther into the felly itself, (*i. e.* the wooden part).

It will be noticed that these slots are arranged (see Fig. 1) so that the slots 30ª are in line as regards the ring 26 and the other parts only when the ring is in its locked position; and to unlock the ring, the lever would be inserted in one of the slots 30ᵇ and pushed till these slots in the ring 26 got in line with the slots in the parts 19 and 15, when the locking ring would become disengaged from the studs 22. For locking the ring, the lever is inserted in one of the slots 30ª. It may be desirable to make the slots in the parts 15 and 19 rather longer than those in the ring 26, to afford good clearance.

When the ring 26 is released, the rim part 19 may be removed from the rim part 14, and the tire replaced or mended as found necessary.

The construction outlined here has many obvious advantages over the type at present in use; it may be readily handled by one man, and it provides no harborage for mud and dirt to rot the tires. The inner tube cannot be "pinched" in putting on or taking off. The movable ring 26 cannot touch or chafe the tire or tube. The taper construction of the felly insures a perfect fit and relieves the bolts (which are an easy fit) from shearing stress.

What I claim as my invention is:—

In a demountable rim and in combination, an annular rim part having tapered portions adjacent to the inner and outer edges of its periphery and formed with a flange offset inwardly at the inner edge and another smaller flange offset outwardly at the outer edge, a second rim part having an inwardly offset flange adapted to abut the flange of the first rim part and having an outwardly offset flange, a clamping ring having keyhole slots, and studs adapted to extend through both rim sections and provided with annular grooves coacting with the keyhole slots in the clamping ring.

In witness whereof I have hereunto set my hand in the presence of two witnesses.

CHARLES DANIEL MAHONY.

Witnesses:
　T. C. LEDINGHAM,
　STEPHEN W. PALMER.